(No Model.)
J. M. LONG & C. E. McBETH.
CULTIVATOR.
No. 295,779. Patented Mar. 25, 1884.
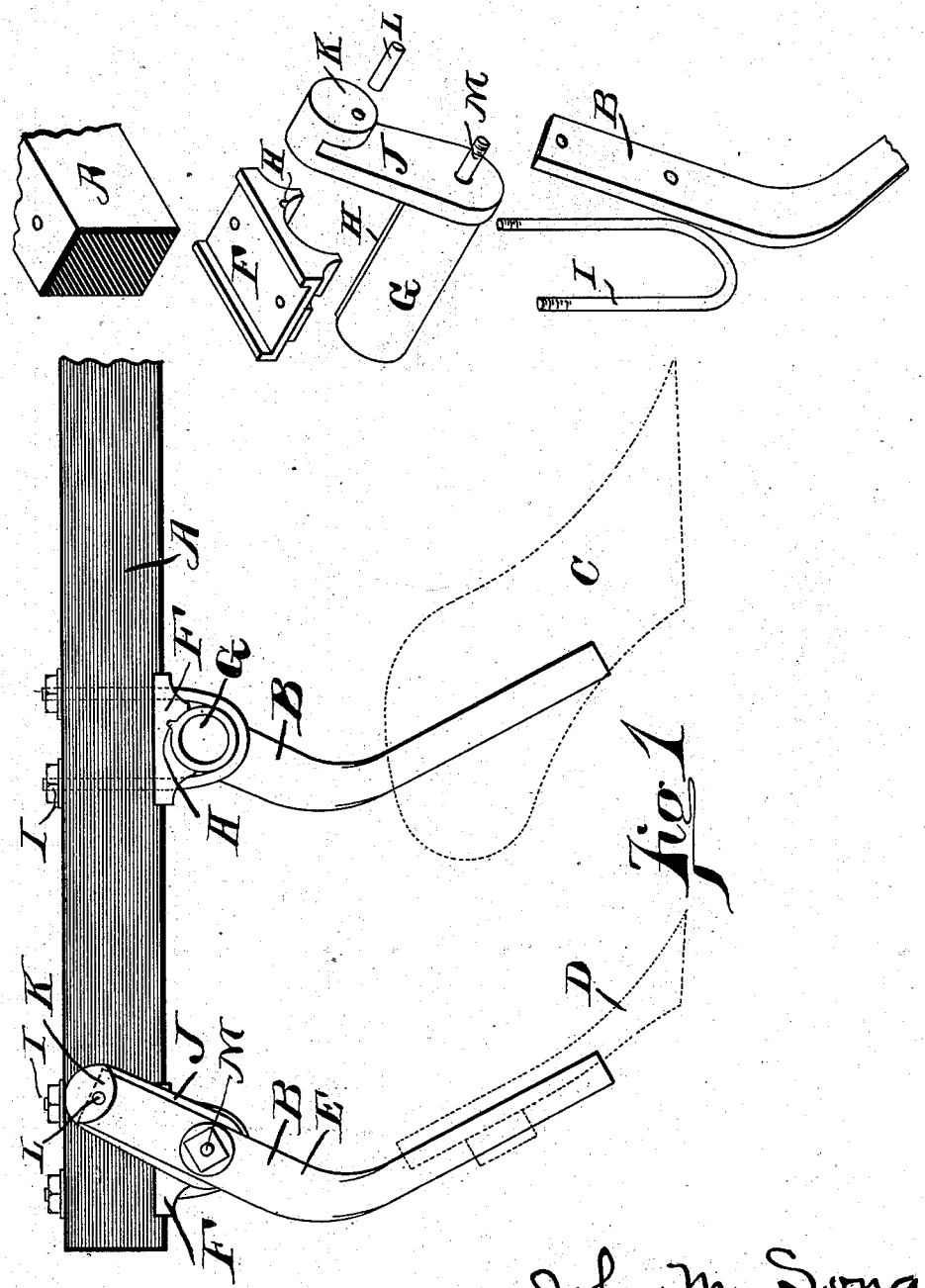

UNITED STATES PATENT OFFICE.

JOHN M. LONG AND CHARLES E. McBETH, OF HAMILTON, OHIO.

CULTIVATOR.

SPECIFICATION forming part of Letters Patent No. 295,779, dated March 25, 1884.

Application filed January 4, 1884. (No model.)

*To all whom it may concern:*

Be it known that we, JOHN M. LONG and CHARLES E. McBETH, of Hamilton, Butler county, Ohio, have invented certain new and useful Improvements in Cultivators, of which the following is a specification.

This invention pertains to that class of cultivators having one or more cultivator-teeth attached to the draft-beam; and it relates particularly to the construction of the device for securing the teeth to the beam and effecting their side adjustment with reference thereto.

The invention will be understood from the following description, taken in connection with the accompanying drawings, in which—

Figure 1 is a side view of part of a draft-beam of a cultivator having two teeth attached by our improved device, and Fig. 2 is a perspective view of the various parts dissected.

In the drawings, A represents the draft-beam of a cultivator; B, the tooth-shanks attached thereto; C, an outline of a cultivator-tooth attached to one of the shanks and having a plow shape; D, a cultivator-tooth attached to the rear shank and having the form known as "bull-tongue;" E, the rear one of the two shanks shown; F, a saddle seated upon the under side of the beam at each shank; G, a cylindrical stud projecting at right angles from the side of each shank and fitting the saddle F in such manner as to be capable of a sliding motion across the beam; H, a rib upon the surface of the stud G, engaging a suitable ribway in the saddle; I, a stirrup engaging the stud, the saddle, and the plow-beam, as shown, and serving to unite the parts rigidly; J, a shank-receiving arm upon one end of the stud G; K, a depending hood at the extremity of said arm, adapted to cap over the upper end of the shank when the latter is properly secured to the stud; L, a break-pin, of suitable weak material, passing through the hood and the upper extremity of the shank; M, a bolt in the end of the stud, adapted to pass through the shank and secure the two together. The stud G is cast hollow, the end opposite the arm J being left open, and the bolt M is inserted through the open end of the stud, so as to present its body as a projection outside the face of the arm J, as clearly shown in Fig. 2. This bolt serves to secure the shank to the stud, as shown, and the break-pin in the upper portion of the stud-arm and shank serves to maintain the shank in proper working position. The stud G, when the stirrup I is loose, is free to slide lengthwise in the saddle, and the rib-work H prevents rotation. The stirrup I, being drawn up firmly by the nuts at its top, holds the stud firmly in place in the saddle, and by loosening the stirrup the stud can be adjusted endwise in adjusting the side position of the shanks and their attached teeth. The stud G is shown as cylindrical and provided with a rib to prevent rotation; but any other parallel form adapted to slide in the saddle without rotation may be employed.

In Fig. 1 the rear shank is shown as being upon that side of the beam nearest the spectator, while the front shank is located upon the distant side. Therefore there is some distance between their respective lines of travel, and this distance is alterable at will in the manner mentioned.

We claim as our invention—

1. The combination of a tooth-shank provided with a stud of parallel form projecting at right angles from the side thereof, a beam provided with a receiving feature suited to receive said stud and permit its endwise adjustment without permitting rotation, and a clamp for drawing said stud firmly into engagement with said receiving feature, substantially as and for the purpose set forth.

2. The combination of shank B, the cylindrical ribbed sliding stud secured thereto, the saddle F, fitting said ribbed stud, the beam A, and the stirrup I, engaging the stud, the saddle, and the beam, substantially as and for the purpose set forth.

JOHN M. LONG.
CHARLES E. McBETH.

Witnesses:
W. A. SEWARD,
J. W. SEE.